(12) United States Patent
Delfino et al.

(10) Patent No.: US 11,455,073 B2
(45) Date of Patent: Sep. 27, 2022

(54) METHOD FOR GENERATING A MOVEMENT OF A THREE-DIMENSIONAL PART OF A THREE-DIMENSIONAL ASSEMBLY IN A THREE-DIMENSIONAL SCENE, COMPRISING AT LEAST A ROTATION AT MOST BY A PREDETERMINED ANGLE

(71) Applicant: Dassault Systemes, Velizy Villacoublay (FR)

(72) Inventors: Christophe Rene Francis Delfino, La Colle sur Loup (FR); Guillaume Romain Dayde, Grasse (FR)

(73) Assignee: Dassault Systemes, Velizy Villacoublay (FR)

( * ) Notice: Subject to any disclaimer, the term of this patent is extended or adjusted under 35 U.S.C. 154(b) by 60 days.

(21) Appl. No.: 16/542,048

(22) Filed: Aug. 15, 2019

(65) Prior Publication Data
US 2020/0081604 A1    Mar. 12, 2020

(30) Foreign Application Priority Data

Sep. 12, 2018   (EP) .................................... 18306192

(51) Int. Cl.
*G06F 3/0481*        (2022.01)
*G06F 3/0484*        (2022.01)
(Continued)

(52) U.S. Cl.
CPC ...... *G06F 3/04815* (2013.01); *G06F 3/04845* (2013.01); *G06F 3/04847* (2013.01); *G06T 13/20* (2013.01); *G06T 2200/24* (2013.01)

(58) Field of Classification Search
CPC ............. G06F 3/04815; G06F 3/04845; G06F 3/04847; G06T 13/20; G06T 2200/24;
(Continued)

(56) References Cited

U.S. PATENT DOCUMENTS 8,452,435 B1 *  5/2013  Vieilly .................... G06T 19/20
                                                          700/98
2003/0187532 A1  10/2003  Bernard et al.
(Continued)

FOREIGN PATENT DOCUMENTS

EP          1059618 A2    12/2000

OTHER PUBLICATIONS

GoEngineer, https://www.youtube.com/watch?v=OHVyb3fmG9l (Year: 2015).*

(Continued)

*Primary Examiner* — Adam M Queler
*Assistant Examiner* — Pritisha N Parbadia
(74) *Attorney, Agent, or Firm* — Hamilton, Brook, Smith & Reynolds, P.C.

(57) ABSTRACT

A computer-based system and method generate a movement of a 3D part of a 3D assembly in a 3D scene. Movement of the 3D part represents rotation by a predetermined angle. The method a) displays a 3D assembly of 3D parts in the 3D scene; b) selects a 3D part of the 3D assembly; and c) displays in the 3D scene a 3D manipulator. The 3D manipulator comprises three axes, and is anchored to the 3D part at an anchor point. The method then d) drags the 3D manipulator along one axis by a current distance from the anchor point on the axis. The predetermined angle corresponds to a maximum distance from the anchor point. The method e) while dragging the 3D manipulator, computes a ratio of the current distance to the maximum distance, and f) generates the movement of the 3D part proportionally to the ratio.

11 Claims, 6 Drawing Sheets

(51) Int. Cl.
    *G06T 13/20*     (2011.01)
    *G06F 3/04815*     (2022.01)
    *G06F 3/04845*     (2022.01)
    *G06F 3/04847*     (2022.01)

(58) Field of Classification Search
    CPC ......... G06T 2210/12; G06T 2219/2016; G06T 19/20
    USPC ........................................................ 715/848
    See application file for complete search history.

(56) References Cited

U.S. PATENT DOCUMENTS

| | | | |
|---|---|---|---|
| 2005/0057579 A1 | 3/2005 | Young | |
| 2006/0111182 A1* | 5/2006 | Nakanishi | A63F 13/2145 463/36 |
| 2013/0332119 A1* | 12/2013 | Santiquet | G06F 3/04847 703/1 |
| 2014/0104266 A1* | 4/2014 | Stone | G06T 30/00 345/419 |
| 2018/0089362 A1* | 3/2018 | Delfino | G06T 19/00 |
| 2020/0098154 A1* | 3/2020 | Marinier | G06F 3/0486 |

OTHER PUBLICATIONS

TutorialField, https://www.youtube.com/watch?v=U5wyYUOk9hY (Year: 2017).*

TFI, https://www.youtube.com/watch?v=ZxiN_M5zwO4 (Year: 2015).* https://www.youtube.com/watch?v=OHVyb3fmG9 (Year: 2015) ; GoEngineer.* https://www.youtube.com/watch?v=U5wyYUOk9hY (Year: 2017); TutorialField.*

Extended European Search Report for EP Application No. 18306192.8, titled: Method for Generating a Movement Comprising at Least a Rotation, Date of Completion of Search: Feb. 26, 2019.

Anonymous: "Car Rigging 3ds Max Tutorial | Tutorial-Bone-Yard," Retrieved from the Internet at: http://www.tutorialboneyard.com/car-rigging-in-3ds-max/, Retrieved on: Feb. 14, 2019 (38 pages).

Schmidt, R. et al., "Sketching and Composing Widgets for 3D Manipulation," Eurographics 2008, vol. 27, No. 2, pp. 301-310 (Apr. 1, 2008).

Stork, André et al., "Efficient and Precise Solid Modelling using a 3D Input Device," Proceedings of the Fourth Symposium on Solid Modeling and Applications, Atlanta, GA, pp. 181-194 (May 14-16, 1997).

* cited by examiner

METHOD FOR GENERATING A MOVEMENT OF A THREE-DIMENSIONAL PART OF A THREE-DIMENSIONAL ASSEMBLY IN A THREE-DIMENSIONAL SCENE, COMPRISING AT LEAST A ROTATION AT MOST BY A PREDETERMINED ANGLE

RELATED APPLICATION(S)

This application claims priority under 35 U.S.C. § 119 or 365 to European Application No. 18306192.8, filed on Sep. 12, 2018. The entire teachings of the above application(s) are incorporated herein by reference.

FIELD OF INVENTION

The invention relates to the field of computer programs and more specifically to a method, a computer program product, a non-volatile computer-readable data-storage medium, a Computer Aided Design system and a three-dimensional illustration authoring system for generating a movement of 3D parts of a 3D assembly in a 3D scene. It pertains to the field of computer graphics, and more particularly to the field of authoring systems.

BACKGROUND

Authoring systems, such as the one provided by Dassault Systèmes under the trademark CATIA Composer, enables the users to create 2D or 3D documentations, technical illustrations, and animations, starting from an existing 3D assembly of 3D parts. The user creates clear and understandable technical illustrations relative to the 3D parts, through detailed images and animations. For example, the user can create an interactive material table (or parts catalogue) of the 3D parts, or an exploded view of the 3D assembly. Animations relative to maintenance and training operations and assembly instructions can also be produced thanks to an authoring system. The invention relates more particularly to these kinds of applications.

The users of authoring systems are not only design engineers, manufacturing engineers, and technical illustrators, but also users with a little or even no CAD experience. Thus, authoring systems have to be easy to use.

Animations involving a translation, a rotation, or a combination of a translation and a rotation are commonly created by the users of authoring systems, for example, but not exclusively, in the manufacturing field or in the handiwork field, to illustrate assembling or disassembling procedures. One illustration of combination of a translation and a rotation is the screwing operation, or the unscrewing operation. For example, the 3D part may be a screw or a bolt, and the 3D assembly is a 3D object comprising at least the 3D part.

In the existing authoring systems, for example in CATIA Composer, one way of creating an animation involving a translation of a 3D part is to use a manipulator called "compass". The compass is disclosed in document US 2003/0187532 A1. In the existing authoring systems, the user clicks (presses the cursor and releases) on the compass with the cursor to activate it, and drags the compass to the 3D part to be translated. Then, he releases the compass on the 3D part, which anchors the compass to the 3D part. The user selects one of the axes of the compass, and the dragging of the cursor causes the 3D part to move in translation in the direction of the selected axis. During the dragging of the cursor, an avatar of the 3D part is translated; the 3D part is then positioned instead of the avatar when the user releases the pressed button. The authoring system finally creates the keys (time markers) of the translation animation, which are then interpolated by the authoring system, in order to create the animation.

Similarly, in order to create a rotation animation, the user clicks on the compass with the cursor, and drags the compass to the 3D part to be rotated. Then, he releases the compass on the 3D part, which anchors the compass to the 3D part. The user selects one of the arcs of the compass, and the dragging of the cursor causes the 3D part to move in rotation about the axis which is normal to the plane of the selected arc. During the dragging of the cursor, an avatar of the 3D part is rotated; the 3D part is then positioned instead of the avatar when the user releases the pressed button. Another possibility is to select the axis of rotation, and to enter the number of degrees in a dialog box. The authoring system finally creates the keys of the rotation animation, like for the translation animation.

With the above described manipulator the user can create exclusive motions, i.e. a translation or a rotation. However, the use of the described manipulator is not simple for users with no CAD experience. Besides, if the user wants to create an animation of a screwing or unscrewing operation in a 3D scene, he firstly creates the rotation animation, which causes the 3D part to spin in place. The authoring system creates the keys which represent the rotation. Then, he creates the translation animation, which causes the spinning 3D part to translate, for the last keys of the rotation animation. Therefore, the animation does not involve a simultaneous rotation and translation, starting from the beginning of the rotation.

A way to get around that is to create a rotation animation of the 3D part, then to create an assembly, and to put the rotating 3D part in the assembly. Lastly, the user animates the assembly with a translation motion, thereby creating an animation of translation of the rotating 3D part. This solution is cumbersome, since the user has move the cursor outside the 3D scene, navigate in a menu outside the 3D scene to create the assembly, drag the 3D part (from a feature tree) to the assembly in the menu, and name the assembly.

Therefore, this solution is not ease of use, and users with a little or even no CAD experience usually do not know how to create an assembly, and abandon creating an animation combining a rotation and a translation.

This way of proceeding may also be time-consuming, even for users which are familiar with authoring systems, if they have to create repetitive animations of screwing or unscrewing.

SUMMARY

A goal of the invention is then to provide a computer-implemented method for generating at least a movement of rotation of a 3D part in a 3D scene, which is ease of use, and time-saving, and in particular for generating a screwing/unscrewing movement.

It is proposed, according to one aspect of the invention, a computer-implemented method for generating a movement of a 3D part of a 3D assembly in a 3D scene, the movement of the 3D part comprising at least a rotation at the most by a predetermined angle, the method comprising the steps of:

a) displaying a 3D assembly of 3D parts in the 3D scene;

b) selecting a 3D part of the 3D assembly;

c) displaying in the 3D scene a 3D manipulator comprising three axes, said 3D manipulator being anchored to the 3D part in an anchor point;

d) dragging the 3D manipulator along one axis by a current distance from the anchor point on said one axis, the predetermined angle corresponding to a maximum distance from the anchor point;

e) while dragging the 3D manipulator, computing a ratio of the current distance to the maximum distance, and f) generating the movement of the 3D part proportionally to the ratio.

According to particular embodiments of the invention:

The rotation is combined with a translation along the axis and a rotation around the axis, representing a screwing or an unscrewing according to a predetermined thread pitch.

In the predefined method:

Step b) comprises identifying a bounding box enclosing the 3D part; and

Step c) comprises positioning the anchor point in the center of the bounding box.

In the predefined method:

Step b) comprises identifying three secant edges of the bounding box, and

Step c) comprises aligning the axes of the 3D manipulator with the three secant edges of the bounding box.

The movement further comprises a translation, without rotation, by a predetermined length along the axis, the method comprising the steps of:

In step d), splitting the maximum distance into two partial maximum distances, the predetermined angle corresponding to a first partial maximum distance, the predetermined length corresponding to a second partial maximum distance;

In step e), computing a first ratio of the current distance to the first partial maximum distance, determining an intermediate point located on the axis, away from the anchor point by the first partial maximum distance, resetting the value of the current distance, recomputing it starting from the intermediate point and computing a second ratio of the recomputed current distance to the second partial maximum distance;

In step f), generating the rotation of the 3D part proportionally to the first ratio and the translation of the 3D part proportionally to the second ratio.

The method comprises a step of setting at least a parameter of the movement, said step comprising the sub-steps of:

detecting a first user interaction on the 3D manipulator in response to the detection of the first user interaction, displaying at least one value of the parameter of the movement;

detecting an updating of the value by a user, thereby setting the parameter of the movement.

The method comprises a step of selecting one movement among a plurality of movements, comprising the sub-steps of:

detecting a second user interaction on the 3D manipulator in response to the detection of the second user interaction, a sub-step of displaying a set of icons representing respective movements of the plurality of movements;

detecting a third user interaction on one among the set of icons, thereby selecting the corresponding movement.

The method comprises a step of creating a video animation of the movement.

The invention also relates to a computer program product, stored on a non-volatile computer-readable data-storage medium, comprising computer-executable instructions to cause a computer system to carry out the predefined computer-implemented method.

The invention also relates to a non-volatile computer-readable data-storage medium containing computer-executable instructions to cause a computer system to carry out the predefined computer-implemented method.

The invention also relates to a Computer Aided Design system comprising a processor coupled to a memory and a graphical user interface, the memory storing computer-executable instructions to cause the Computer Aided Design system to carry out the predefined computer-implemented method.

The invention also relates to a three-dimensional illustration authoring system comprising a processor coupled to a memory and a graphical user interface, the memory storing computer-executable instructions to cause the three-dimensional illustration authoring system to carry out the predefined computer-implemented method.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

The invention will be better understood with the study of some embodiments described by way of non-limiting examples and illustrated by the accompanying drawings wherein.

DETAILED DESCRIPTION

A description of example embodiments follows.

The teachings of all patents, published applications and references cited herein are incorporated by reference in their entirety.

Figure 1:
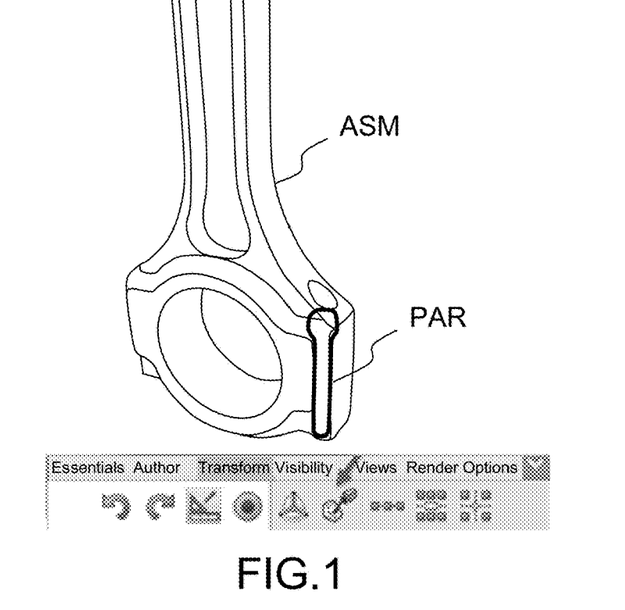
FIGS. 1 to 8 illustrate the implementation of the method according to the invention.

FIG. 1 illustrates steps a) and b) of the method according to the invention. In a first step a), a 3D assembly ASM of 3D parts is displayed in the 3D scene. On FIG. 1, the 3D assembly ASM is composed two 3D parts: a connecting rod, and a screw. Thanks to the invention, the user of the authoring system creates an animation of the unscrewing of the screw outside the connecting rod. The 3D assembly may comprise other parts, and may also be integrated in an assembly comprising other 3D parts. For the sake of simplicity, in the present application, the 3D assembly is composed of only two 3D parts.

The 3D assembly ASM is presented on the screen according to a certain viewpoint of the 3D scene; the viewpoint can be modified, according to known techniques.

In a second step b), the user selects one 3D part PAR of the 3D assembly ASM, among all the 3D parts which compose the 3D assembly. There are several ways to select one of the 3D parts. The first one is to navigate in the 3D scene, and to select one of the 3D parts in the 3D scene. In touch mode (with a finger or stylus), the user makes a long press on one of the 3D parts; with the mouse, he makes a click on one of the 3D parts. A "click" refers to pressing and releasing. Alternatively, the 3D assembly may be displayed as a "feature tree", in a menu located outside the 3D scene. Thus, the user scrolls down the feature tree, and selects one of the 3D parts in the feature tree. Alternatively, the 3D part may be selected by invoking a search engine in the authoring system. For example, the user makes a query on the name of the 3D part, or on some of its properties. Once selected, the 3D part is highlighted. On FIG. 1, the selected 3D part (the screw) is obscured by the connecting rod; thus, highlighting the selected 3D part, or its contour, improves the visibility of the selected 3D part.

Hereafter, the 3D part refers only to the selected 3D part of the 3D assembly, for which the user wants to generate a movement.

The movement of the 3D part PAR is generated by using a 3D manipulator. A 3D manipulator is a graphical artifact controllable by a mouse or with stylus or a finger on a touch screen. The 3D manipulator can be invoked through a dedicated command. For example, once the user has selected the 3D part PAR, he clicks on a dedicated icon, which may be located in a ribbon provided in the 3D scene, or outside the 3D scene, as illustrated on FIG. 1. The activation of the 3D manipulator can also be proposed to the user in a contextual menu, which may be located close to the 3D part PAR, and which offers relevant commands for the 3D part. The contextual menu can be permanently displayed in the 3D scene, or it can also be displayed in response to a user interaction, for example a right click with the mouse, in the 3D scene, or a tap in the 3D scene, in touch mode. Alternatively, the 3D manipulator can be invoked by using a keyboard shortcut, or by voice command.

Figure 2:
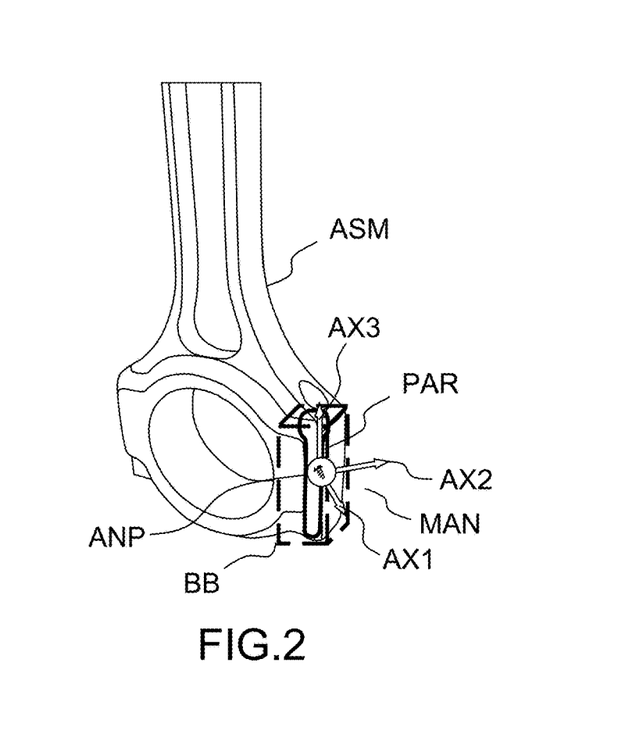

FIG. 2 illustrates step c) of the method according to the invention. The invoked 3D manipulator MAN comprises three axes (AX1, AX2, AX3). The three axes form a spatial system, preferentially an orthogonal spatial system, with three orthogonal axes, and an origin. An icon representing schematically the movement may be located at the origin of the orthogonal spatial system. The orthogonal axes are represented by three arrows, offering different directions of manipulation. The 3D manipulator MAN can be positioned, by default, anywhere in the 3D scene. In particular, it can be positioned by default close to, or on the 3D part PAR. Therefore, the user manipulates the 3D manipulator MAN, and sees the movement of the 3D part, in a same field of view. In a preferred embodiment, the 3D manipulator MAN is positioned by default in the center of a bounding box BB enclosing the 3D part PAR. The bounding box BB is a rectangular cuboid of minimal size, which encompasses the 3D part PAR. The center of the bounding box BB is computed, and corresponds to the center of the bounding box BB. In any case, the user can modify the default position of the 3D manipulator, for example by dragging the 3D manipulator MAN while pressing a dedicated key of the keyboard, for example the "CTRL" key.

The location of the origin of the spatial system is stored as an anchor point ANP for the 3D manipulator MAN. The anchor point ANP is a fixed point, which corresponds to the default or modified location of the origin of the spatial system. Then, the 3D manipulator MAN is dragged by the user, and one of the principles of the invention is to generate the movement of the 3D part according to the distance between the anchor point ANP and the 3D manipulator MAN.

Then, a maximum distance MD is computed. In a preferred embodiment, the maximum distance MD is a distance in pixels, which corresponds to a fraction of the smallest dimension of the monitor (usually the vertical length). For example, the maximum distance MD corresponds to half of the smallest dimension of the monitor. Indeed, the user tends to position his viewpoint so that the 3D part would be in the center of the monitor. The maximum distance MD can also be equal to the fraction of the smallest dimension of the monitor, minus a margin, which can be predefined.

Alternatively, the maximum distance MD could be referred as the distance between the anchor point ANP and the edge of the window, in the direction of the axis of the movement, Alternatively, the maximum distance MD may be a fraction (for example half) of the distance between the anchor point ANP and the edge of the window. Therefore, the user does not have to drag the 3D manipulator MAN over a long distance. In any case, the maximum distance MD may be set by the user, by selecting one of the aforementioned methods.

Once the maximum distance MD has been computed, it is associated to the predetermined angle. Thus, even if the user drags the 3D manipulator MAN beyond the maximum distance MD, the generation of the movement stops.

In step d), the user drags the 3D manipulator along one of its axes (AX1, AX2, AX3). As illustrated on FIG. 3, the user drags the 3D manipulator MAN along the axis AX3. In touch mode, "dragging" refers to maintaining contact between the appendage (stylus or finger) and the touch-screen. With the mouse, "dragging" refers to pressing on a click (for example left click), without releasing. During the dragging, the 3D manipulator MAN follows the movement of the cursor, according to the command of the mouse, or of the appendage.

Figure 3:
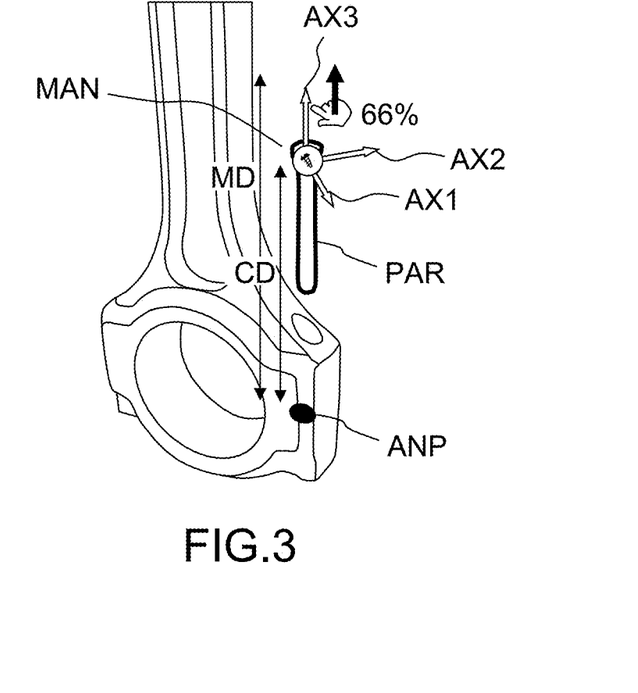

The movement to be generated comprises at least a rotation, by a predetermined angle. Without any limitation, the generated movement may be:

a rotation of the 3D part PAR by a predetermined angle; the user drags the 3D manipulator along the axis of rotation;

a combination of a rotation by a predetermined angle around the axis of rotation, with a translation by a predetermined length along the same axis. The user drags the 3D manipulator along the aforesaid axis. A screwing or an unscrewing movement represents such a combination. The movement representing a combination of a rotation with a translation is performed according to a predetermined thread pitch. The thread pitch is the distance between threads of the screw, along the axis of rotation and translation. The thread pitch is usually expressed in millimeters. For example, a thread pitch of 1.5 means that the distance between one thread and the next is 1.5 mm. The combination can also be characterized by a predetermined angle of rotation, and a by a predetermined length of translation (for example 720° and 10 mm);

a rotation of the 3D part by a predetermined angle, followed by a translation of the 3D part by a predetermined length (or inversely);

a screwing or an unscrewing according to a predetermined thread pitch, followed by a translation by a predetermined length or a rotation by a predetermined angle (or inversely).

The distance between the anchor point ANP and 3D manipulator MAN is permanently computed, as soon as the user starts to drag the 3D manipulator MAN. The distance, called "current distance" CD, extends more precisely from the anchor point ANP to the origin of the spatial system. The user drags the 3D manipulator MAN along the axis of the movement. Thus, the user "pulls" the arrow of the axis, in order to generate the movement. On FIG. 3, the axis of the movement is the axis AX3. The user does not necessarily position the cursor exactly on the axis of the movement. If the cursor lies outside the axis of the movement, the 3D manipulator MAN moves according to the projection of the cursor on the axis.

In step e), while dragging the 3D manipulator MAN, a ratio of the current distance CD to the maximum distance MD is computed.

In step f), the movement of the 3D part is generated proportionally to the ratio. According to an embodiment of the invention, the computed ratio is displayed, for example close to the 3D manipulator MAN, or close to the cursor. For example, on FIG. 3 the computed ratio is equal to 66%. Thus, the user sees a representation of the timeline of the movement. The authoring system finally creates the keys (time markers) of the movement, which are then interpolated by the authoring system, in order to create the animation of the movement.

If the movement comprises at least two different sequences (for example firstly a rotation or a screwing by a predetermined angle, and secondly a translation by a predetermined length), the maximum distance MD is split, in step d), into as many partial maximum distances. The amplitude of each sequence corresponds to a partial maximum distance. For example, with firstly a rotation or a screwing by a predetermined angle, and secondly a translation by a predetermined length, the predetermined angle corresponds to a first partial maximum distance MD1, and the predetermined length corresponds to a second partial maximum distance MD2.

The splitting of the maximum distance MD may be equal for all the different sequences. Alternatively, the splitting of the maximum distance MD is performed in proportion to the predetermined angle and/or the predetermined length of the different sequences.

Figure 4:
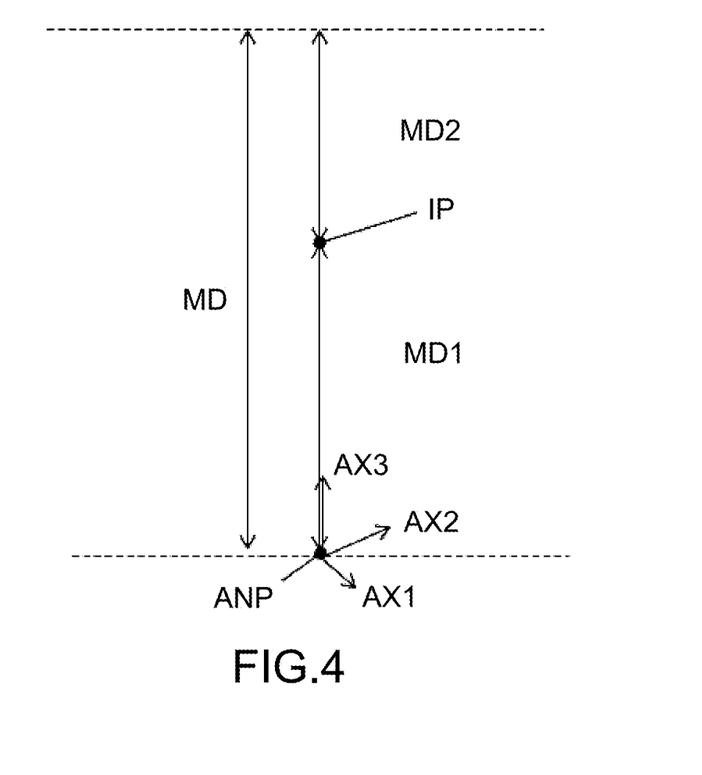

Then, in step e), a first ratio of the current distance CD to the first partial maximum distance MD1 is computed. An intermediate point IP, located on the axis, and away from the anchor point ANP by the first partial maximum distance MD1 is determined. FIG. 4 illustrates schematically a splitting of the maximum distance MD. When the 3D manipulator MAN is away from the anchor point ANP by the first partial maximum distance MD1, the value of the current distance CD is reset, and recomputed starting from the intermediate point IP; then a second ratio of the recomputed current distance CD to the second partial maximum distance MD2 is computed.

Lastly, in step f), the rotation of the 3D part is generated proportionally to the first ratio, and the translation of the 3D part is generated proportionally to the second ratio.

It is understood that the same applies for a movement comprising firstly a translation, and secondly a screwing or a rotation. In that case, the predetermined length corresponds to the first partial maximum distance MD1, and the predetermined angle corresponds to the second partial maximum distance MD2.

Besides, for a movement comprising more than two sequences, several intermediate points IP are computed, and the current distance CD is reset, and recomputed starting from each intermediate point IP.

The movement which is illustrated on FIG. 3 comprises several sequences: first, an unscrewing of the 3D part PAR along the axis AX3; then a translation along the axis AX3. At the beginning of the movement, the 3D manipulator MAN is located, by default, in the center of the bounding box BB of the 3D part PAR. However, as the movement progresses, the 3D manipulator MAN may be dragged along the axis of the movement "faster" than the 3D part itself. For example, if the movement is a rotation, the 3D part PAR rotates around the axis of the movement, whereas the 3D manipulator is dragged along the axis of the movement. The same applies, if the movement is an unscrewing by a small predetermined length, compared to the maximum distance.

Figure 5:
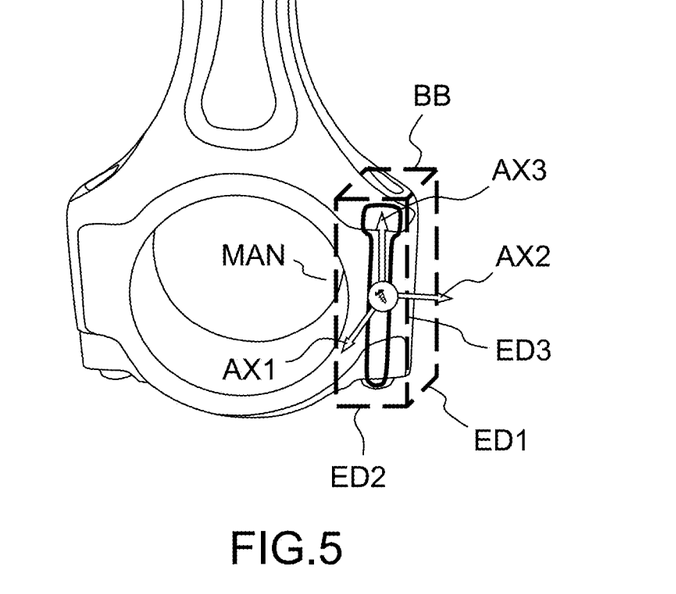

According to a preferred embodiment, the orientation of the 3D manipulator MAN matches the orientation of the 3D part PAR, as illustrated by FIG. 5. For that, in step b), three secant edges (ED1, ED2, ED3) of the rectangular cuboid constituting the bounding box BB are identified. Then, in step c), the axes (AX1, AX2, AX3) of the 3D manipulator MAN are aligned with the three secant edges of the bounding box BB. Therefore, if the 3D part PAR appears obliquely in the 3D scene, the 3D manipulator MAN, when invoked, appears also obliquely. Besides, if the 3D part PAR appears in the 3D scene with a preset rotation angle, the axes of the 3D manipulator are aligned with the secant edges of the bounding box BB, so that the rotation movement takes the preset rotation angle into account. Optionally, if the movement is a rotation or a screwing/unscrewing, the 3D manipulator MAN may rotate around the axis of the movement, so as to keep the alignment of the axes of the 3D manipulator MAN with the secant edges of the bounding box BB.

Before or after dragging the 3D manipulator MAN, the user can interact with it, so as to set some parameters of the movement. Thus, the method comprises a step of setting at least a parameter of the movement.

In a first sub-step, a first user interaction is detected on the 3D manipulator MAN. The detection can be performed during step c), i.e. before the generation of the movement, after step f), i.e. after the generation of the movement, and even during the generation of the movement, if the user stops dragging the 3D manipulator MAN. For example, the first user interaction can be a double-click on an icon MI located in the origin of the spatial system, as illustrated on FIG. 6. In touch mode, the first user interaction can be a double-tap.

Figure 7:
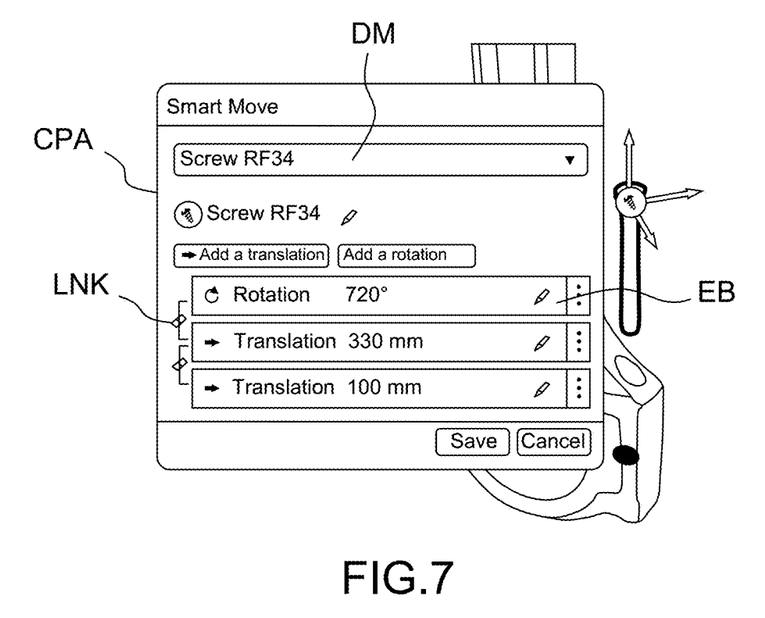

In a second sub-step, at least one value of the parameter of the movement is displayed, in response to the detection of the first user interaction. As illustrated by FIG. 7, a customization panel CPA can be displayed. Thanks to edition buttons EB of the customization panel CPA, the user can modify the predetermined angle of the rotation, or the predetermined length of the translation. Each elementary movement (rotation or translation) can be edited separately. The combination of elementary movements, for example a screwing/unscrewing, is displayed through a link LNK. The user may activate or deactivate the link LNK by clicking on it. The user can freely deactivate any link LNK. However, in order to activate a link LNK between two elementary movements, it is detected that both elementary movements are different, and that both elementary movements are not bound to an existing link. The user can also add an elementary movement, or change the sequential order of the elementary movements.

In a third sub-step, an updating of the value by the user is detected, for example, by clicking on a dedicated button in the customization panel CPA thereby setting the parameter of the movement.

The user can also select another movement for the 3D part PAR. For that, a drop-down menu DM, in the customization panel CPA, lets the user choose which movement he edits.

In other ways, the user can select another movement among a plurality of movements for the 3D part PAR, without the need to launch the customization panel CPA.

Figure 6:
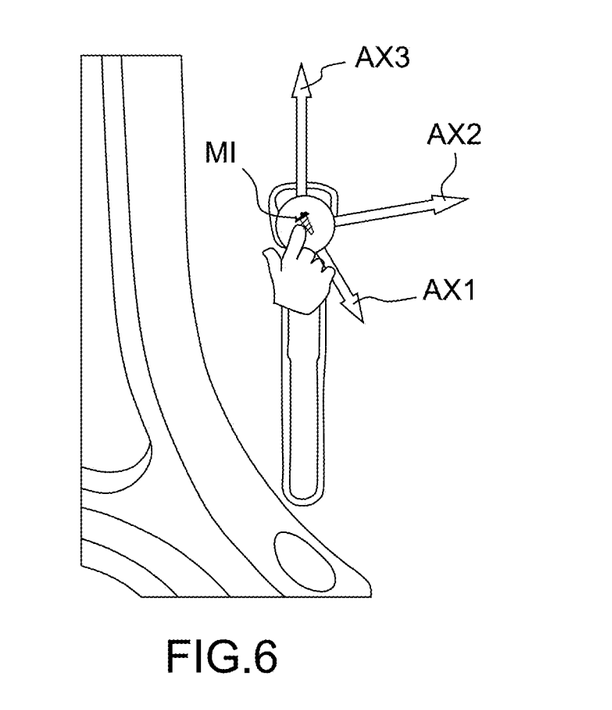
Figure 8:
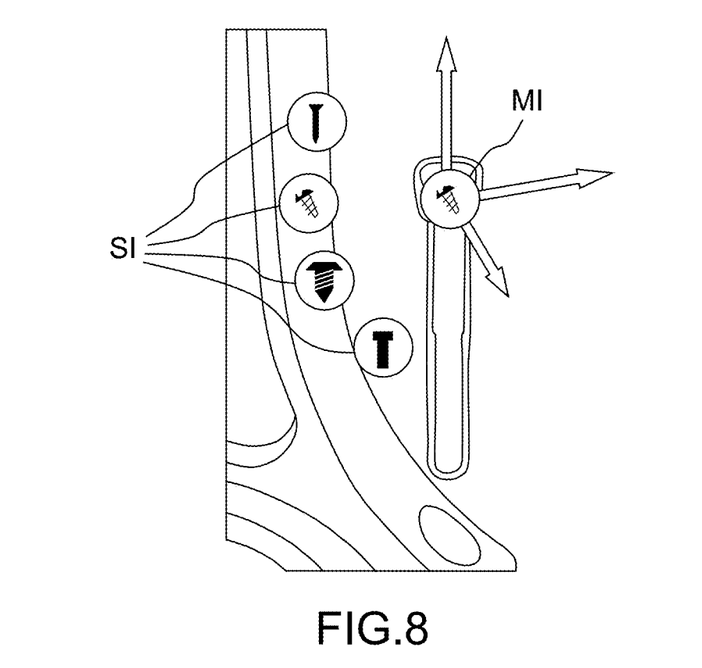

Before the generation of the movement, after the generation of the movement, and even during the generation of the movement, the user can interact with the 3D manipulator MAN (see FIG. 6). Referring to FIG. 8, through a second user interaction, different from the first user interaction, a set of icons (MI, SI) representing respective movements of the plurality of movements can be displayed. The second user interaction is, for example, a single click, or tap in touch mode, on the origin of the spatial system. A main icon MI, located in the origin of the spatial system represents a schematic view of the movement. Secondary icons SI, located proximally to the origin of the spatial system represent respective schematic views of the other movement among the plurality of movements. Incidentally, a video illustrating the movement is displayed, when the cursor is over one of the icons, or through a dedicated command in touch mode. Then, another movement is selected for the 3D part PAR, if a third interaction is detected, for example, a single click, or tap in touch mode, on one of the icons.

Figure 9:
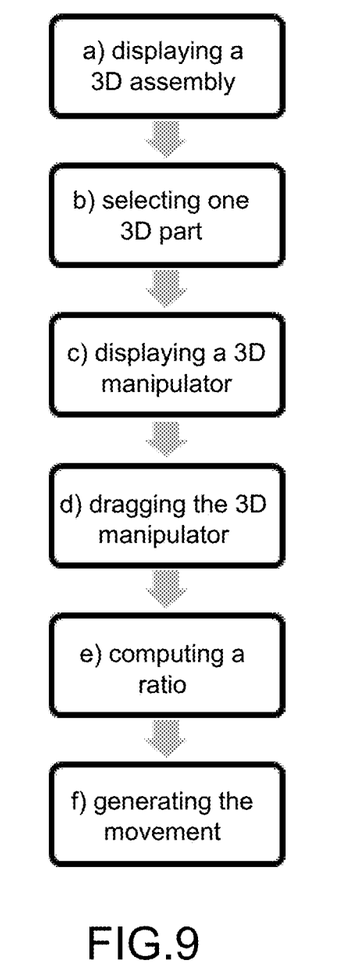
FIG. 9 illustrates a flow chart of the method according to the invention.

FIG. 9 illustrates a flow chart of the method according to the invention, in particular steps a) to f) of the method according to the invention.

The present invention provides to the user an efficient tool for performing rotations and translations, and combinations of rotations and translations. The animations are created more easily, especially for assembly or disassembly procedures, in particular containing screws or bolts. Moreover, the setting of those movements is harmonized, through the use of the aforementioned customization panel.

The inventive method can be performed by a suitably-programmed general-purpose computer or computer system, possibly including a computer network, storing a suitable program in non-volatile form on a computer-readable medium such as a hard disk, a solid state disk or a CD-ROM and executing said program using its microprocessor(s) and memory.

Figure 10:
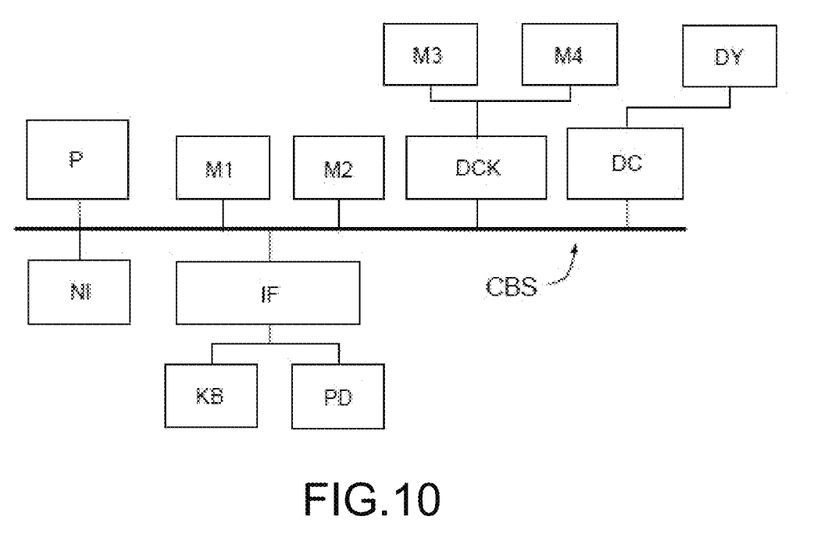
FIGS. 10 and 11 illustrate a computing environment in which the present invention may be implemented.

A computer—more precisely a Computer Aided Design or illustration authoring system, or station—suitable for carrying out a method according to an exemplary embodiment of the present invention is described with reference to FIG. 10. In FIG. 10, the computer includes a Central Processing Unit (CPU) P which performs the processes described above. The process can be stored as an executable program, i.e. a set of computer-readable instructions in memory, such as RAM M1 or ROM M2, or on hard disk drive (HDD) M3, DVD/CD drive M4, or can be stored remotely. Moreover, one or more computer files defining the three-dimensional scene (e.g. an exploded view of an assembly of objects) in which a movement of a 3D part PAR has to be generated may also be stored on one or more of memory devices M1 to M4, or remotely.

The claimed invention is not limited by the form of the computer-readable media on which the computer-readable instructions and/or the digital files of the inventive process are stored. For example, the instructions and files can be stored on CDs, DVDs, in FLASH memory, RAM, ROM, PROM, EPROM, EEPROM, hard disk or any other information processing device with which the Computer Aided Design or illustration authoring station communicates, such as a server or computer. The program and the files can be stored on a same memory device or on different memory devices.

Further, a computer program suitable for carrying out the inventive method can be provided as a utility application, background daemon, or component of an operating system, or combination thereof, executing in conjunction with CPU 800 and an operating system such as Microsoft VISTA, Microsoft Windows 8, UNIX, Solaris, LINUX, Apple MAC-OS and other systems known to those skilled in the art.

CPU P can be a Xenon processor from Intel of America or an Opteron processor from AMD of America, or can be other processor types, such as a Freescale ColdFire, IMX, or ARM processor from Freescale Corporation of America. Alternatively, the CPU can be a processor such as a Core2 Duo from Intel Corporation of America, or can be implemented on an FPGA, ASIC, PLD or using discrete logic circuits, as one of ordinary skill in the art would recognize. Further, the CPU can be implemented as multiple processors cooperatively working to perform the computer-readable instructions of the inventive processes described above.

Through lowering the number of user manipulations, compared to the state of the art, the computing time of the CPU is significantly reduced. Indeed, in the state-of-the-art solutions, a combined movement of rotation and translation is split. Therefore, a first matrix is computed for the translation of the 3D part, and a second matrix is computed for the rotation. Then, a matrix product of the first matrix by the second matrix is computed, for the combination of translation and rotation. Thus, two matrix computations are performed. In the method according to the invention, only one matrix computation is performed.

Besides, in the state of the art solutions, the user makes first a translation, the keys of the translation are created; then, he makes a rotation, and the keys of the rotation are created (or inversely). According to the invention, the user makes a combined rotation/translation, and the keys are created. This also reduces the computing time of the CPU.

The Computer Aided Design or illustration authoring station in FIG. 10 also includes a network interface NI, such as an Intel Ethernet PRO network interface card from Intel Corporation of America, for interfacing with a network, such as a local area network (LAN), wide area network (WAN), the Internet and the like. The Computer Aided Design or illustration authoring station further includes a display controller DC, such as a NVIDIA GeForce GTX graphics adaptor from NVIDIA Corporation of America for interfacing with display DY, such as a Hewlett Packard HPL2445w LCD monitor. A general purpose I/O interface IF interfaces with a keyboard KB and pointing device PD, such as a roller ball, mouse, touchpad and the like. The display, the keyboard and the pointing device, together with the display controller and the I/O interfaces, form a graphical user interface, used by the user to provide input commands—e.g. to move the pointer tool, select a point or a plane . . . —and by the Computer Aided Design or illustration authoring station for displaying the three-dimensional scene, the graphical tools (plane selector, pointer tool) and the polyline.

Disk controller DKC connects HDD M3 and DVD/CD M4 with communication bus CBS, which can be an ISA, EISA, VESA, PCI, or similar, for interconnecting all of the components of the Computer Aided Design or illustration authoring station.

A description of the general features and functionality of the display, keyboard, pointing device, as well as the display controller, disk controller, network interface and I/O interface is omitted herein for brevity as these features are known.

Figure 11:
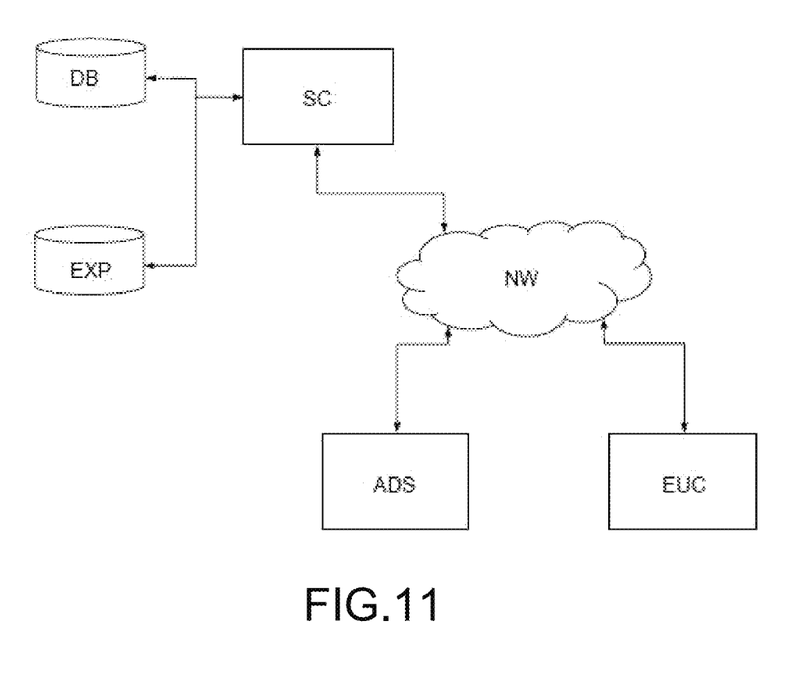

FIG. 11 is a block diagram of a computer system suitable for carrying out a method according to a different exemplary embodiment of the present invention.

In FIG. 11, the executable program EXP and the computer files defining the three-dimensional scene are stored on memory devices connected to a server SC. The memory devices and the overall architecture of the server may be the same as discussed above with reference to FIG. 10, except that display controller, display, keyboard and/or pointing device may be missing in the server.

The server SC is then connected to an administrator system ADS and end user computer EUC via a network NW.

The overall architectures of the administrator system and of the end user computer may be the same as discussed above with reference to FIG. 10, except that the memory devices of the administrator system and the end user computer do not store the executable program EXP and/or the computer files defining the three-dimensional scene. However, the end user computer does store a client program designed for cooperating with the executable program of the server, as it will be discussed below.

As can be appreciated, the network NW can be a public network, such as the Internet, or a private network such as an LAN or WAN network, or any combination thereof and can also include PSTN or ISDN subnetworks. The network NW can also be wired, such as an Ethernet network, or can be wireless such as a cellular network including EDGE, 3G and 4G wireless cellular systems. The wireless network can also be Wi-Fi, BLUETOOTH®, or any other wireless form of communication that is known. Thus, the network NW is merely exemplary and in no way limits the scope of the present advancements.

The client program stored in a memory device of the end user computer and executed by a CPU of the latter accesses, via the network NW, a database DB stored by the server SC and containing files defining three-dimensional scenes in which a movement of a 3D part PAR has to be generated. This allows an end user to open and possibly modify such a file, to parameterize a graphical representation of the scene and to generate a movement of a 3D part as described above. The server performs the processing as described above, and transmits to the end user computer an image file corresponding to the desired representation of the scene including the polyline, again using the network NW.

Although only one administrator system ADS and one end user system EUX are shown, the system can support any number of administrator systems and/or end user systems without limitation. Similarly, multiple servers can also be implemented in the system without departing from the scope of the present invention.

Any processes described herein should be understood as representing modules, segments, or portions of code which include one or more executable instructions for implementing specific logical functions or steps in the process, and alternate implementations are included within the scope of the exemplary embodiment of the present invention.

While example embodiments have been particularly shown and described, it will be understood by those skilled in the art that various changes in form and details may be made therein without departing from the scope of the embodiments encompassed by the appended claims.

What is claimed is:

1. A computer-implemented method for generating a movement of a given three-dimensional (3D) part of a 3D assembly of 3D parts in a 3D scene, the movement of the given 3D part comprising at least a rotation at most by a predetermined angle, the method comprising the steps of:
   a) displaying the 3D assembly of 3D parts in the 3D scene;
   b) selecting the given 3D part of the 3D assembly of 3D parts;
   c) displaying in the 3D scene a 3D manipulator comprising three axes, said 3D manipulator being anchored to the given 3D part in an anchor point;
   d) dragging the 3D manipulator along one axis of the three axes by a current distance from the anchor point on said one axis, the predetermined angle corresponding to a maximum distance from the anchor point; and
   e) responsive to the dragging the 3D manipulator:
       e1) computing a ratio of the current distance to the maximum distance, and
       e2) generating the movement of the given 3D part proportionally to the ratio, such that the movement comprising at least a rotation at most by the predetermined angle stops if the 3D manipulator is dragged beyond the maximum distance;
   wherein the movement further comprises a translation, without rotation, by a predetermined length along said one axis, the method further comprising:
       (i) in step d), splitting the maximum distance (MD) into two partial maximum distances (MD1, MD2), the predetermined angle corresponding to a first partial maximum distance (MD1) of the two partial maximum distances (MD1, MD2), the predetermined length corresponding to a second partial maximum distance (MD2) of the two partial maximum distances (MD1, MD2);
       (ii) in step e1), computing a first ratio of the current distance (CD) to the first partial maximum distance (MD1), determining an intermediate point located on said one axis, away from the anchor point (ANP) by the first partial maximum distance (MD1), recomputing the current distance (CD) starting from the intermediate point and computing a second ratio of the recomputed current distance (CD) to the second partial maximum distance (MD2); and
       (iii) in step e2), generating the rotation of the given 3D part proportionally to the first ratio and the translation of the given 3D part proportionally to the second ratio.

2. The computer-implemented method according to claim 1, wherein the rotation is combined with the translation such that the translation occurs along said one axis and the rotation occurs around said one axis, representing a screwing or an unscrewing according to a predetermined thread pitch.

3. The computer-implemented method according to claim 1, wherein:
   selecting the given 3D part comprises identifying a bounding box enclosing the given 3D part; and
   displaying in the 3D scene the 3D manipulator comprises positioning the anchor point in a center of the bounding box.

4. The computer-implemented method according to claim 3, wherein:
   selecting the given 3D part further comprises identifying three secant edges of the bounding box, and
   displaying in the 3D scene the 3D manipulator further comprises aligning the axes of the 3D manipulator with the three secant edges of the bounding box.

5. The computer-implemented method according to claim 1, further comprising a step of setting a parameter of the movement, said setting a parameter of the movement comprising:
   detecting a user interaction on the 3D manipulator;
   in response to the detection of the user interaction, displaying at least one value of the parameter of the movement; and detecting an updating of the at least one value of the parameter by a user, thereby setting the parameter of the movement.

6. The computer-implemented method according to claim 1, further comprising a step of selecting one movement among a plurality of movements, wherein selecting the one movement comprises:
   detecting a first user interaction on the 3D manipulator;
   in response to the detection of the first user interaction, displaying a set of icons representing respective corresponding movements of the plurality of movements; and
   detecting a second user interaction on one icon among the displayed set of icons, thereby selecting the corresponding movement the one icon represents.

7. The computer-implemented method according to claim 1, further comprising a step of creating a video animation of the movement.

8. A computer program product comprising:
   a non-volatile computer-readable data-storage medium; and
   computer-executable instructions carried on the data-storage medium including instructions that cause a computer system to generate a movement of a given 3D part of a 3D assembly of 3D parts in a 3D scene, the movement of the given 3D part comprising at least a rotation at most by a predetermined angle, the generating being performed by:
   a) displaying the 3D assembly of 3D parts in the 3D scene;
   b) selecting the given 3D part of the 3D assembly of 3D parts;
   c) displaying in the 3D scene a 3D manipulator comprising three axes, said 3D manipulator being anchored to the given 3D part in an anchor point;
   d) dragging the 3D manipulator along one axis of the three axes by a current distance from the anchor point on said one axis, the predetermined angle corresponding to a maximum distance from the anchor point; and
   e) responsive to the dragging the 3D manipulator:
      e1) computing a ratio of the current distance to the maximum distance, and
      e2) generating the movement of the given 3D part proportionally to the ratio, such that the movement comprising at least a rotation at most by the predetermined angle stops if the 3D manipulator is dragged beyond the maximum distance;
   wherein the movement further comprises a translation, without rotation, by a predetermined length along said one axis, the generating being further performed by:
      (i) in step d), splitting the maximum distance (MD) into two partial maximum distances (MD1, MD2), the predetermined angle corresponding to a first partial maximum distance (MD1) of the two partial maximum distances (MD1, MD2), the predetermined length corresponding to a second partial maximum distance (MD2) of the two partial maximum distances (MD1, MD2);
      (ii) in step e1), computing a first ratio of the current distance (CD) to the first partial maximum distance (MD1), determining an intermediate point located on said one axis, away from the anchor point (ANP) by the first partial maximum distance (MD1), recomputing the current distance (CD) starting from the intermediate point and computing a second ratio of the recomputed current distance (CD) to the second partial maximum distance (MD2); and
      (iii) in step e2), generating the rotation of the given 3D part proportionally to the first ratio and the translation of the given 3D part proportionally to the second ratio.

9. A non-volatile computer-readable data-storage medium comprising:
   a memory area containing computer-executable instructions that cause a computer system to generate a movement of a given 3D part of a 3D assembly of 3D parts in a 3D scene, the movement of the given 3D part comprising at least a rotation at most by a predetermined angle, the generating being performed by:
   a) displaying the 3D assembly of 3D parts in the 3D scene;
   b) selecting the given 3D part of the 3D assembly of 3D parts;
   c) displaying in the 3D scene a 3D manipulator comprising three axes, said 3D manipulator being anchored to the given 3D part in an anchor point;
   d) dragging the 3D manipulator along one axis of the three axes by a current distance from the anchor point on said one axis, the predetermined angle corresponding to a maximum distance from the anchor point; and
   e) responsive to the dragging the 3D manipulator (MAN):
      e1) computing a ratio of the current distance (CD) to the maximum distance (MD), and
      e2) generating the movement of the given 3D part proportionally to the ratio, such that the movement comprising at least a rotation at most by the predetermined angle stops at the predetermined angle once if the 3D manipulator has been is dragged beyond the maximum distance;
   wherein the movement further comprises a translation, without rotation, by a predetermined length along said one axis, the generating being further performed by:
      (i) in step d), splitting the maximum distance (MD) into two partial maximum distances (MD1, MD2), the predetermined angle corresponding to a first partial maximum distance (MD1) of the two partial maximum distances (MD1, MD2), the predetermined length corresponding to a second partial maximum distance (MD2) of the two partial maximum distances (MD1, MD2);
      (ii) in step e1), computing a first ratio of the current distance (CD) to the first partial maximum distance (MD1), determining an intermediate point located on said one axis, away from the anchor point (ANP) by the first partial maximum distance (MD1), recomputing the current distance (CD) starting from the intermediate point and computing a second ratio of the recomputed current distance (CD) to the second partial maximum distance (MD2); and
      (iii) in step e2), generating the rotation of the given 3D part proportionally to the first ratio and the translation of the given 3D part proportionally to the second ratio.

10. A Computer Aided Design system comprising:
    a processor coupled to a memory and a graphical user interface;
    the memory storing computer-executable instructions that cause the Computer Aided Design system to generate a movement of a given 3D part of a 3D assembly of 3D parts in a 3D scene, the movement of the given 3D part comprising at least a rotation at most by a predetermined angle, the generating being performed by:

a) displaying the 3D assembly of 3D parts in the 3D scene;
b) selecting the given 3D part of the 3D assembly of 3D parts;
c) displaying in the 3D scene a 3D manipulator comprising three axes, said 3D manipulator being anchored to the given 3D part in an anchor point;
d) dragging the 3D manipulator along one axis of the three axes by a current distance from the anchor point on said one axis, the predetermined angle corresponding to a maximum distance from the anchor point; and
e) responsive to the dragging the 3D manipulator:
  e1) computing a ratio of the current distance to the maximum distance, and
  e2) generating the movement of the given 3D part proportionally to the ratio, such that the movement comprising at least a rotation at most by the predetermined angle stops if the 3D manipulator is dragged beyond the maximum distance;
wherein the movement further comprises a translation, without rotation, by a predetermined length along said one axis, the generating being further performed by:
  (i) in step d), splitting the maximum distance (MD) into two partial maximum distances (MD1, MD2), the predetermined angle corresponding to a first partial maximum distance (MD1) of the two partial maximum distances (MD1, MD2), the predetermined length corresponding to a second partial maximum distance (MD2) of the two partial maximum distances (MD1, MD2);
  (ii) in step e1), computing a first ratio of the current distance (CD) to the first partial maximum distance (MD1), determining an intermediate point located on said one axis, away from the anchor point (ANP) by the first partial maximum distance (MD1), recomputing the current distance (CD) starting from the intermediate point and computing a second ratio of the recomputed current distance (CD) to the second partial maximum distance (MD2); and
  (iii) in step e2), generating the rotation of the given 3D part proportionally to the first ratio and the translation of the given 3D part proportionally to the second ratio.

11. A three-dimensional illustration authoring system comprising:
a processor coupled to a memory and a graphical user interface;
the memory storing computer-executable instructions that cause the three-dimensional illustration authoring system to generate a movement of a given 3D part of a 3D assembly of 3D parts in a 3D scene, the movement of the given 3D part comprising at least a rotation at most by a predetermined angle, the generating being performed by:
a) displaying the 3D assembly of 3D parts in the 3D scene;
b) selecting the given 3D part of the 3D assembly of 3D parts;
c) displaying in the 3D scene a 3D manipulator comprising three axes, said 3D manipulator being anchored to the given 3D part in an anchor point;
d) dragging the 3D manipulator along one axis of the three axes by a current distance from the anchor point on said one axis, the predetermined angle corresponding to a maximum distance from the anchor point; and
e) responsive to the dragging the 3D manipulator:
  e1) computing a ratio of the current distance to the maximum distance (MD), and
  e2) generating the movement of the given 3D part proportionally to the ratio, such that the movement comprising at least a rotation at most by the predetermined angle stops if the 3D manipulator is dragged beyond the maximum distance;
wherein the movement further comprises a translation, without rotation, by a predetermined length along said one axis, the generating being further performed by:
  (i) in step d), splitting the maximum distance (MD) into two partial maximum distances (MD1, MD2), the predetermined angle corresponding to a first partial maximum distance (MD1) of the two partial maximum distances (MD1, MD2), the predetermined length corresponding to a second partial maximum distance (MD2) of the two partial maximum distances (MD1, MD2);
  (ii) in step e1), computing a first ratio of the current distance (CD) to the first partial maximum distance (MD1), determining an intermediate point located on said one axis, away from the anchor point (ANP) by the first partial maximum distance (MD1), recomputing the current distance (CD) starting from the intermediate point and computing a second ratio of the recomputed current distance (CD) to the second partial maximum distance (MD2); and
  (iii) in step e2), generating the rotation of the given 3D part proportionally to the first ratio and the translation of the given 3D part proportionally to the second ratio.

* * * * *

UNITED STATES PATENT AND TRADEMARK OFFICE
CERTIFICATE OF CORRECTION

PATENT NO. : 11,455,073 B2
APPLICATION NO. : 16/542048
DATED : September 27, 2022
INVENTOR(S) : Christophe Rene Francis Delfino and Guillaume Romain Dayde It is certified that error appears in the above-identified patent and that said Letters Patent is hereby corrected as shown below:

In the Claims

In Claim 9, Column 14, Lines 32 to 33, delete "at the predetermined angle once if the 3D manipulator has been" and insert --if the 3D manipulator--.

Signed and Sealed this
Fifteenth Day of November, 2022

Katherine Kelly Vidal
*Director of the United States Patent and Trademark Office*